Dec. 13, 1966  J. A. SOULES ET AL  3,292,103
LASER IMAGE AMPLIFYING SYSTEM
Filed March 15, 1963
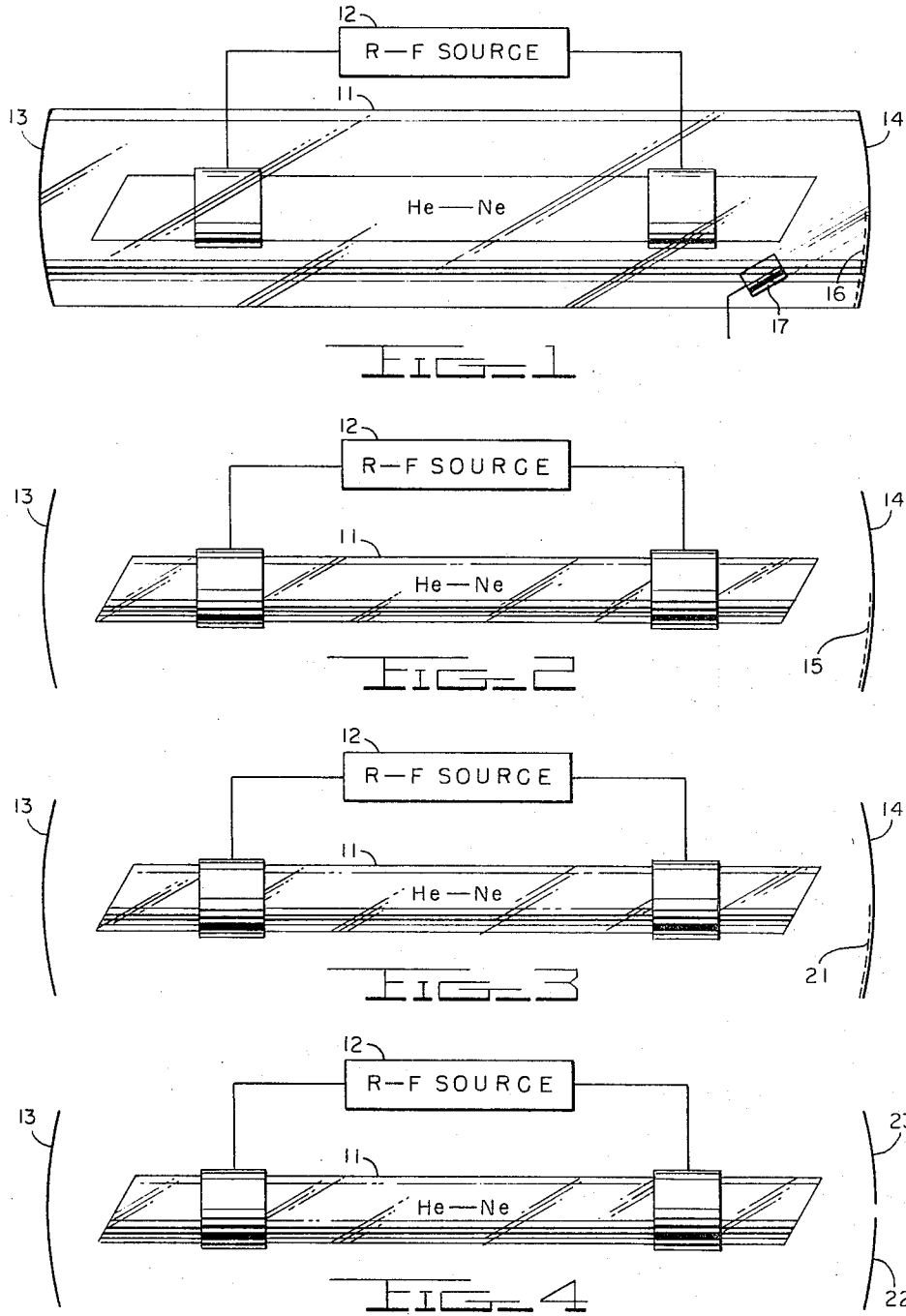
INVENTORS
FRANCIS T. BYRNE
JACK A. SOULES
BY
AGENT
ATTORNEY

United States Patent Office 3,292,103
Patented Dec. 13, 1966

3,292,103
LASER IMAGE AMPLIFYING SYSTEM
Jack A. Soules, 870 N. Arlington Mill Drive, Arlington, Va., and Francis T. Byrne, 123 Hamilton Ave., Silver Spring, Md.
Filed Mar. 15, 1963, Ser. No. 266,156
5 Claims. (Cl. 331—94.5)

The invention described herein may be manufactured and used by or for the Government of the United States of America for governmental purposes without the payment of any royalties thereon or therefor.

The present invention relates to a LASER system and more particularly to an optical image amplifying system using a LASER generator or oscillator.

Heretofore, it has been proposed that LASERS be used as high intensity light sources for drilling holes in diamonds, cutting metals, communications systems, as a carrier of intelligence and for scientific exvperimentation, as well as for technological and military purposes.

It is well known that a successful operation of an optical LASER requires optical cavity end plates of high reflectivity in order to establish the necessary conditions for oscillation. In typical cases, a change in reflectivity of one end mirror from about 99% to about 98% causes oscillations to cease. In the present invention, image amplification with a very high gain is made possible by modifying the reflectivity of certain areas of one of the mirrors thereby controlling the oscillation mode of the LASER affected by the modified reflectivity area.

It is therefore an object of the present invention to provide a high gain optical image amplifying system.

Another object is to provide a system for transmitting an image by use of a LASER.

Still another object is to provide a system for projecting an invisible image into a visible image.

Yet another object is to transmit an electron image into a visible image.

While still another object is to project an infrared or ultraviolet image into a visible image.

Another object is to project a visible image into a more intense visible image.

Other objects and advantages of the invention will hereinafter become more fully apparent from the following description of the annexed drawing, wherein FIG. 1 illustrates a LASER system for carrying out the invention; and FIGS. 2, 3, and 4 illustrate modifications of the system shown by illustration in FIG. 1.

The present invention is directed to an optical amplifying system which makes use of a LASER with spherical confocal surfaces of high reflectivity opposite each end of the LASER element. As usual, one of the surfaces of high reflectivity is fully reflective while the other reflective surface is partially reflective. The LASER may be a gas LASER, typically excited by an RF discharge, or any other LASER operating at a low enough level of optical pumping that gain control is accomplished by control of the reflectivity of the cavity mirror. A desired image is projected onto the partially reflective surface by an electron gun, by infrared, visible, or ultraviolet light. The image projected onto one-half of the partially reflective surface modifies the reflectivity of the partially reflective surface in the image area such that oscillations in the LASER cease for those areas flooded by the image projected onto the partially reflective surface. The light waves not affected by the image will continue to oscillate and will emerge from the partially reflective surface through the area on the reflective surface which is not flooded by the image. Thus the bright output of the LASER replicates the image with a high increase in contrast. The LASER image formed in this manner is limited by diffraction effects.

Now, referring to the drawing, there is shown by illustration an optical image amplifying system which comprises a gas LASER 11 of any well known type such as the type including ten parts helium to one part neon enclosed in an elongated cylindrical chamber which has end surfaces at Brewster's angle with suitable optical qualities for passing light waves without affecting their directional paths. Confocal spherical reflective surfaces are positioned adjacent to the end surfaces with the focal point of the reflective surfaces being on the axis of the chamber at the mid-point thereof. One of the reflective surfaces is a fully reflective mirror 13 (at least 99%) and the other reflective surface is a partially reflective active mirror 14 which is normally operative to pass about one percent of incident light waves. Such systems and their operation are well known in the art and it is well known in the art that a change in reflectivity of one end mirror from about 99% to about 98% causes the LASER operation to cease in the affected modes.

The present invention makes use of the above knowledge of the LASER operation due to mirror reflectivity to carry out the teaching of the present invention. It has been determined that if a reflective surface is used that decreases its reflectivity when an image is applied onto the surface that the oscillation mode for those surface areas will cease. An image is projected onto one-half of the mirror only and the half of the mirror not covered by the image is not affected. Thus, those areas of the reflective surface that are not covered by the image reflect the light in the usual manner such that the LASER operates to produce light waves which pass through those portions of the reflective surface that are not covered. The image, then, will be outlined by the light that passes through the reflective surface to produce the image onto a receiver. More specifically the above teaching can be applied to amplify images by several methods in changing the reflectivity of the active mirror surface.

Different images can be amplified by positioning different semitranspraent films 15 that contain an image over only one-half of the reflective surface of the active mirror 14 in the path of the light waves of the LASER element. The image in the semitransparent film causes the covered portion of the reflective mirror surface to be less reflective causing those light producing portions of the LASER to cease operation. The bright output of the LASER through those portions of the partially reflective mirror not covered by the image causes the LASER to replicate the image with a vast increase in contrast. Changing the image containing semitransparent film will change the projection and amplification of different images.

Modification of one-half of the active mirror with a coating of a transparent phosphor film 16 makes the partially reflective mirror surface suitable for operation with an electron gun 17 such as illustrated in FIG. 1. The LASER envelope or chamber and the electron gun are housed within an evacuated envelope for satisfactory operation of the electron gun and phosphor. The electron gun "writes" an image onto the phosphor film which decreases the reflectivity of the partially reflective surface over the image areas which modulates the LASER output as described above for the image covering the reflective surface of the partially reflective mirror.

The modification shown by illustration in FIG. 3 represents a gas LASER in which one-half of the active mirror partially reflective surface is coated with a film or transparent material 21 whose absorptivity is a function of illumination and is insensitive to the LASER frequency. Thus, an image can be projected onto the film by infrared, visible or ultraviolet light which then reduces the reflectivity of the partially reflective surface to the light waves of the LASER. Again the LASER output is modulated similar to the above described manner by causing certain of the LASER oscillations to cease due to the images projected onto the film 21.

An example of such an active film is a film of $EuCl_3$ a few microns thick. When cooled below 20° K. such a film is transparent to visible light. Upon illumination by infrared radiation containing wavelengths of 7–14 microns, the film becomes opaque to red light and effectively controls the spatial oscillation mode of the LASER.

In the modifications described in FIGS. 2 and 3, the film coated partially reflective mirrors can be replaced by a partially reflecting mirror made of selenium or some similar semiconductor material whose reflectivity is a function of illumination by radiation or of electrons. Thus a single mirror surface can be made to replace the described film coated-partially reflecting mirrors shown by illustration in FIGS. 2 and 3.

The modification shown by illustration in FIG. 4 makes use of two spherical partially reflective mirrors 22, 23, that replace the normally used single partially reflective mirror such as set forth above. Separate images are projected onto each of the reflective mirror surfaces at the same time. The light paths are such that only when both mirrors are reflecting at a given pair of points, does LASER oscillation in that mode occur. Thus, information correlation can be optically arranged for image amplification in a LASER system.

The usefulness of a LASER as an optical image amplifier system according to the teaching of this invention can be simplified by using an active LASER material made of a plurality of optically pumped fibers assembled in a cylindrical cluster. Thus each of the fibers would act as an amplifier for single bits of information displayed on the partially reflective surface. Therefore the decrease in reflectivity of certain areas of the partially reflective surface caused by the image displayed on the surface would stop the particular fibers from lasing. Thus those fibers that lase will replicate the image with an increase in contrast.

Obviously many modifications and variations of the present invention are possible in the light of the above teachings. It is therefore to be understood that within the scope of the appended claims the invention may be practiced otherwise than as specifically described.

What is claimed is:

1. An optical image amplifier system which makes use of a LASER oscillator comprising:
   (a) a LASER oscillator,
   (b) said LASER oscillator comprising an element within which LASER action takes place, confocal spherical reflector surfaces positioned adjacent each end of said element, and means for optically pumping said oscillator,
   (c) one of said reflector surfaces having a fully reflective surface,
   (d) the other of said reflective surfaces having a partially reflective surface, and
   (e) a semitransparent film containing an image thereon and inserted juxtaposed said partially reflective surface over one half the area of said partially reflective surface in which the area covered is entirely on one side of a line normal to the axis of said LASER between said one-half of the partially reflective surface and the end of said element in the path of light waves emerging from the end of said element toward said partially reflective surface to reduce the reflectivity of said partially reflective surface in the areas covered by said image and thereby cause some oscillations in said element to cease.

2. An optical image amplifier system which makes use of a LASER oscillator comprising:
   (a) a LASER oscillator,
   (b) said LASER oscillator comprising an element within which LASER action takes place, confocal spherical reflector surfaces positioned adjacent each end of said element, and means for optically pumping said oscillator,
   (c) one of said reflector surfaces having a fully reflective surface,
   (d) the other of said reflective surfaces having a partially reflective surface,
   (e) a film of transparent material coated onto one-half of said partially reflective surface on the side thereof facing the end of said element, and
   (f) means for applying an image onto said film on said coated portion of said partially reflective surface whereby said image reduces the reflectivity of said partially reflective surface in the areas covered by said image and thereby causes oscillations in said element to cease.

3. An optical image amplifier system which makes use of a LASER oscillator comprising:
   (a) a LASER oscillator,
   (b) said LASER oscillator comprising an element within which LASER action takes place, confocal spherical reflector surfaces positioned adjacent each end of said element, and means for optically pumping said oscillator,
   (c) one of said reflector surfaces having a fully reflective surface,
   (d) the other of said reflective surfaces having a partially reflective surface, and
   (e) a transparent phosphor film coated onto one-half of said partially reflective surface,
   (f) a chamber enclosed by said confocal spherical reflector surfaces including said element, and
   (g) an electron gun within said chamber adapted to write an image onto said phosphor film whereby said image reduces the reflectivity of said partially reflective surface in the areas covered by said image and thereby causes some oscillations in said element to cease.

4. An optical image amplifier system which makes use of a LASER oscillator comprising:
   (a) a LASER oscillator,
   (b) said LASER oscillator comprising an element within which LASER action takes place, confocal spherical reflector surfaces positioned adjacent each end of said element, and means for optically pumping said oscillator,
   (c) one of said reflector surfaces having a fully reflective surface,
   (d) the other of said reflective surfaces having a partially reflective surface,
   (e) a coating on one-half of said partially reflective surface in which the absorptivity of said coating is a function of illumination said coating being applied onto the surface of said partially reflective surface on the side thereof facing the end of said element,
   (f) a light projector means for projecting an image onto said coating on said one-half of said partially reflective surface,
   (g) said light projector means projecting light selected from a group comprising infrared, visible and ultraviolet, and whereby
   (h) said image projected onto said coating on said partially reflective surface reduces the reflectivity of said partially reflective surface in the areas covered by said image and thereby causes some oscillations in said element to cease.

5. An optical image amplifier system which makes use of a LASER oscillator comprising:
   (a) a LASER oscillator,
   (b) said LASER oscillator comprising an element within which LASER action takes place, confocal spherical reflector surfaces positioned adjacent each end of said element, and means for optically pumping said oscillator, (c) one of said reflector surfaces having a fully reflective surface, (d) the other of said reflective surfaces being in two separate halves, one half a fully reflecting surface and the other half a partially reflective surface, and (e) means for placing an image between the partially reflective surface and the end of said element in the path of light waves from the end of said element to said partially reflective surface to reduce the reflectivity of said partially reflective surface in the areas covered by said image and thereby cause some oscillations in said element to cease.

References Cited by the Examiner

UNITED STATES PATENTS 3,242,439   3/1966   Rigden et al. _____ 331—94.5

JEWELL H. PEDERSEN, *Primary Examiner.*

SAMUEL FEINBERG, *Examiner.*

L. L. HALLACHER, R. L. WIBERT,
*Assistant Examiners.*